Dec. 17, 1968   J. S. FANNING   3,416,688
BAIT CONTAINER
Filed July 29, 1966
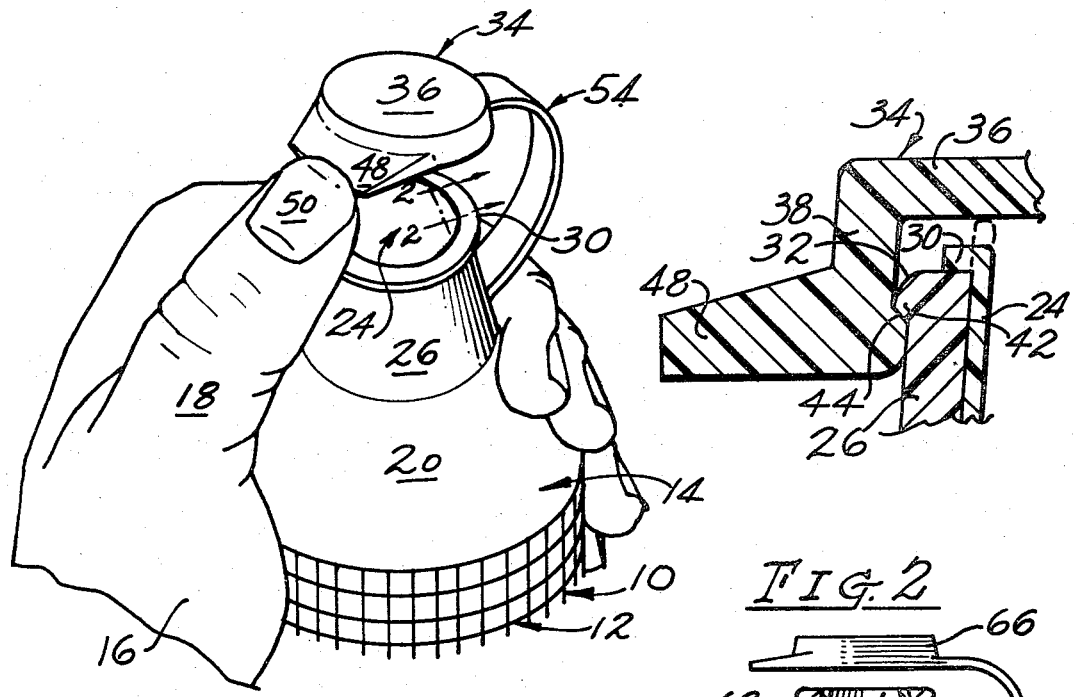
FIG. 1
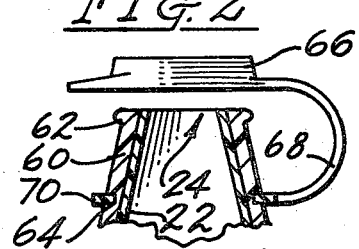
FIG. 5
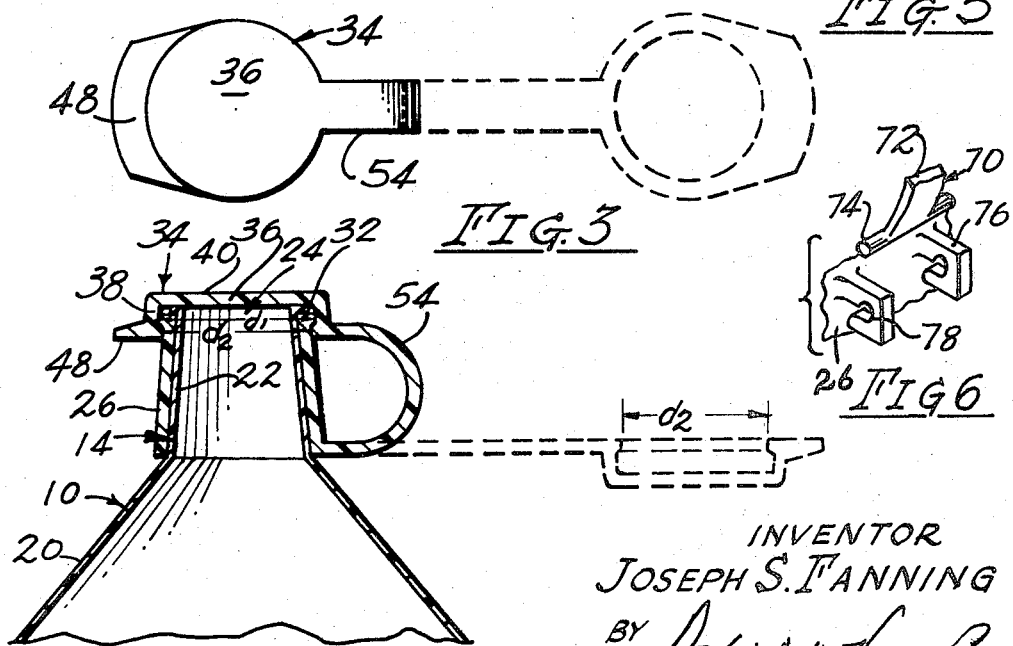
FIG. 3
FIG. 4
FIG. 6
INVENTOR
JOSEPH S. FANNING
BY
ATTORNEY

United States Patent Office 3,416,688
Patented Dec. 17, 1968

3,416,688
BAIT CONTAINER
Joseph S. Fanning, Atlanta, Ga. (% Southern Manufacturing Co., Duluth, Ga. 30136)
Filed July 29, 1966, Ser. No. 568,897
5 Claims. (Cl. 215—41)

ABSTRACT OF THE DISCLOSURE

A cricket or bug container of the sort which is used by fishermen and others to keep live bait for selective use during fishing and the like, having an open top through which the bait is inserted and removed usually with one hand and on which top there is a pressure-fitted closure retained in place by a bendable member which is sufficiently rigid to resist substantial displacement of the closure and to help align it for manipulation by one hand.

---

In U.S. Patent No. 2,756,912, there is shown a bait container of the present type and which discloses a funnel-like top which is closed by a cork. There are some disadvantages to this type of arrangement. For instance, the quality of cork has a bearing on the durability and service. A cork may break while a fisherman is trying to force it from the opening. Also, since the cork is a tapered jammed fit, it is possible to jam the cork too tight in the opening and it becomes difficult to dislodge it during action when fishing. Cork will also take a permanent set as a result of being confined in the neck of the funnel. This results in the cork becoming loose and possibly falling out. There is also a certain amount of expense in purchasing corks. Furthermore, ofttimes the removal of a cork is a two-handed operation when the fisherman only has one hand available. The present arrangement is a better way for many fishermen in several typical situations.

Generally described, without restriction on the scope of my invention, the construction and operation of the container is basically similar to the container described in Patent No. 2,756,912 except for the end of the bait container which has the openable enclosure thereon. According to the present invention, this end of the container may be provided either with the aluminum funnel-like end, or it may be made from plastic or a similar material, and the tapered neck of the funnel is provided with a tapered, open sleeve which fits thereover and may be pressure fitted, to or held in place by a pad or flange. A snap-fit closure of concave configuration complementary to the upper peripheral edge of the neck of the funnel-like element is attached by a flexible strap or strip which has one end integrally formed with or attached to the closure cap and the other end integrally formed with or otherwise attached to the upper portion of the funnel-like member either to the sleeve in the case of a single piece molded part or to the funnel-like member in case of a separate part.

The primary object of this invention is to provide a handy end construction for a bait container which includes a closure that is more easily operated manually.

A further object of this invention is to provide a construction for the bait removal end of a bait container which may be manufactured from a material such as plastic by means of modern plastic mold methods in one or more pieces and assembled easily.

Still another object of this invention resides in the particular construction whereby a sleeve may be fitted over the funnel-like element and held in place with a minimum of fabrication.

Other and further objects and advantages of my invention will become apparent upon reading the following specifications taken in conjunction with the accompanying drawings, in which:

FIG. 1 is a perspective view of the upper, bait-removal end of the bait container having one form of the present end construction and closure thereon.

FIG. 2 is an enlarged cross-sectional view taken substantially along lines 2—2 in FIG. 1.

FIG. 3 is a top plan view of the closure in place on the neck of the bait container and moved out of place as shown in the dotted line.

FIG. 4 is a vertical cross-section view taken through the upper end of the bait container shown in FIG. 1.

FIG. 5 is a cross-section view of another mode of attachment.

FIG. 6 is a perspective view of still another modification in the cap attachment.

The bait container which is used probably more often for carrying live crickets is designated by reference numeral 10 and as stated heretofore the construction of the container, especially with respect to the wire body designated generally by reference numeral 12, the lower end portion which is not shown, and other such details of the construction which do not perform per se a part of this invention, are substantially the same as shown and set forth in Patent No. 2,756,912. The upper part of the present container is designated herein by reference numeral 14 and has one of the hands 16 of a fisherman wrapped thereabout with the thumb 18 in position.

The upper portion 14 comprises a funnel-like member 20 which according to the previous manufature may be made by forming a piece of aluminum into the larger portion which connects to the cage-like wire body 12 and into a tapered neck 22 which is the upper terminal end portion that tapers into an open mouth or entrance 24 as shown in FIG. 4. In the form shown in FIG. 1, which may be modified as pointed out herein, an open tapered sleeve has a taper substantially corresponding to that of the neck 22 and slightly larger but small enough preferably to be forced on neck 22, may be constructed from polyethylene, polypropylene plastic, or other suitable material, by any one of the many known methods of forming same. According to the present construction, the sleeve 26 is positioned over the end of the tapered portion 22 funnel 20 prior to the formation of the flare or flange 30 which is formed by any well known spinning tool which is positioned in the opening 24 or may be staked on with a staking tool to lie over a portion of the edge and end 32 of sleeve 26 and to hold sleeve 26 firmly on the end 24 of the funnel 20 and to prevent dislodgement therefrom even when pressure is applied by the fingers especially by the thumb 18 as shown in FIG. 1. Parts may be secured or attached by adhesive, high frequency vibration (also known as sonic bonding), spinning, stacking or other suitable method. The closure is identified generally by reference numeral 34 and comprises a plastic closure cap 36 which is resilient to some degree and which is concave on the bottom forming a cylindrical opening inside of the cylindrical body 38 depending from the flat top 40 of the closure cap 36. Sleeve 26 is formed with a bead-like portion or annular lip 42 which is complementary to a similar lip 44 formed through the inside of the closure 36 adjacent to the cylindrical portion 38. The diameter across a part of the lip 44 of cap 36 is, prior to expansion of the cap, at least slightly smaller than the diameter from the outside of the bead 32 on one side across the sleeve 26 to the other side thereby presenting a forced fit or pressed fit, sometimes called a snap-fit which is a pressure fitted relationship firmly holding the cap 36 in place and making it difficult to dislodge same unless pressure is applied to expand the diameter across the cap and for this purpose a thumb lever 48 is molded on cap 36 which may be engaged by thumb 18 and even by the finger nail portion 50 thereof. Cap 36 should be resilient enough to permit bending thereof when seated in place as shown in FIG. 4 so that pressure applied beneath the member 48 disengages the inside of cap 36 from the end of sleeve 26. Thus, cap 36 may be opened or closed with one hand leaving the other hand free. Cap 36 may be closed by the forefinger of the hand holding the container 10. To prevent cap 36 from completing falling off the bait container 10, a retaining member 54 is attached at one end to cap 36 and at the other end in some location on the bait container 10. It is preferred that according to the present form of the invention in FIG. 1, the retaining member 54 be in the form of a flat plastic strap of flexible construction and having one end formed integrally with cap 36 and the other end formed integrally to the bottom of sleeve 26 by any suitable forming processes. However, if for reasons of economy or other reasons it is desired to make the retaining member 54 separate from either the cap 36 or the sleeve 26, or both, it is apparent that this may readily be done and retaining member 54 may be glued, riveted or otherwise secured. Retaining member 54 may be made of polyethylene, polypropylene or other such material as would have memory (an expression in the plastic trade which refers to the inherent characteristic of a material to return to its original shape after being moved) so as to cause closure 36 to stay out of the way when open, permitting free and unobstructed removal of the bait. If the funnel-like member 20 is molded from plastic, then the retaining member 54 may be molded at one end integrally therewith and optionally the cap may be molded therewith or separately and the retaining member 54 attached in place or vice-versa.

In FIG. 5 is shown a modified sleeve 60 having a flange 62 formed therewith and having a recessed groove 64 therein. A cap 66 has a retaining member 68 formed therewith and member 68 connects to a ring 70 which snaps in place in groove 64.

An alternative form of attaching one end of the retaining member 54 is shown in FIG. 6 wherein the modified retaining member 72 is provided with projections 74 for insertions, especially in a retaining block 76 located on sleeve 26 having notches 78 thereinto which the projections 74 are forced fitted between opposed resilient portions of a resilient material of member 76. If preferred, blocks 76 may have closed openings (notches 78 being omitted), and member 72 is attached by inserting one projection 74 in one of the holes in one block 76 and pushed to a point where the other projection 74 may be inserted in the other hole.

While I have shown and described a particular embodiment of the bait container, together with suggested alterations thereof and different and optional forms, this is by way of illustration only and does not constitute any sort of limitation on the scope of my invention since various alterations, deviations, changes, eliminations, revisions, additions, substitutions, and modifications may be made in the embodiment shown and described without departing from the scope of my invention as defined in the appended claims.

What is claimed:
1. In a live bait container having a body portion in which is normally contained live bait such as live crickets and being normally closed at one end and having the other end thereof arranged for the selective removal of the bait:
   (a) a three-dimensional portion on the bait removal end of said bait container having a restricted bait removal neck thereon with an opening therein, said neck portion being frusto-conical and terminating in an outwardly directed flange,
   (b) and a closure retaining member of resilient material, said retaining member comprising a hollow frusto-conical sleeve having inside dimensions smaller than the outside dimensions of said frusto-conical neck, said sleeve being resiliently stretched over said neck with one end thereof engaging said body portion and the other end thereof engaging said flange,
   (c) a strap-like resilient member having one end secured to said frusto-conical sleeve and having the other end thereof secured to a resilient closure member adapted for pressure fitting on the upper end of said frusto-conical sleeve, said closure member being provided with a projection thereon at the front thereof to be contacted by one finger to unseal the closure.
2. The device claimed in claim 1 wherein said sleeve, said closure and said strap-like resilient member are formed of the same material and said strap-like resilient member is integral at one end with said closure and at the other end with said sleeve, said material being a resilient plastic such as polyethylene or polypropylene.
3. The device in claim 1, wherein:
said strap-like resilient member is made of a material that has a memory so that said strap-like resilient member tends to return to the original shape and to hold said open closure away from said opening.
4. The device in claim 1, wherein:
said strap-like resilient member has projections thereon, and said sleeve has means thereon in which the projections are supported to retain the strap-like resilient member on the sleeve.
5. The device in claim 1, wherein:
said sleeve has a peripheral groove therein,
said strap-like resilient member has an arcuate attachment portion thereon fitted into said groove on said sleeve.

References Cited
UNITED STATES PATENTS

| | | | |
|---|---|---|---|
| 3,297,192 | 1/1967 | Swett | 220—31 |
| 3,269,575 | 8/1966 | Hammes | 220—38.5 |
| 2,789,717 | 4/1957 | Demke | 215—99 |
| 1,633,197 | 6/1927 | Snyder | 220—30.6 |

FOREIGN PATENTS 998,208    1/1952    France.

JOSEPH R. LECLAIR, *Primary Examiner.*

U.S. Cl. X.R.

222—543; 220—38.5; 215—99